June 20, 1967 W. L. HULSLANDER Re. 26,224

LUBRICATED TAPPING T

Original Filed Nov. 15, 1962

3 Sheets-Sheet 1

INVENTOR.
WILLIAM L. HULSLANDER
BY

ATTORNEY.

June 20, 1967 W. L. HULSLANDER Re. 26,224

LUBRICATED TAPPING T

Original Filed Nov. 15, 1962

3 Sheets-Sheet 2

INVENTOR.
WILLIAM L. HULSLANDER
BY

ATTORNEY.

INVENTOR
WILLIAM L. HULSLANDER
BY

ATTORNEY.

United States Patent Office

Re. 26,224
Reissued June 20, 1967

26,224
LUBRICATED TAPPING T

William L. Hulslander, Bradford, Pa., assignor to Dresser Industries, Inc., Dallas, Tex., a corporation of Delaware Original No. 3,142,205, dated July 28, 1964, Ser. No. 237,874, Nov. 15, 1962. Application for reissue Apr. 14, 1966, Ser. No. 547,085
6 Claims. (Cl. 77—38)

Matter enclosed in heavy brackets [ ] appears in the original patent but forms no part of this reissue specification; matter printed in italics indicates the additions made by reissue.

The present invention relates to tapping T's and is concerned primarily with the penetrating tool which is an essential element of such a T.

A tapping T of the type with which this invention is concerned is ordinarily utilized in conjunction with a gas main. It comprises a T body that is mounted on the main in any approved manner such as by welding and has a vertical passageway or bore extending therethrough. Communicating with this bore is a lateral passage or house outlet. This lateral outlet in effect divides the bore into two portions. A penentrating tool having a body portion of maximum diameter is threadedly mounted in the upper portion of the bore and has a reduced pentrating end portion which passes through the lower portion of the bore to engage and penetrate the main. After penetration, the tool is adapted to be retracted to leave the house outlet open and remain in the upper portion of the bore where it functions as a closure. The primary objective of the present invention is to provide a new and improved penetrating tool.

The gas industry now recognizes that it is extremely desirable to cut a slug or coupon from the main in contrast to chips or shavings which would inevitably fall into the main. Moreover, this invention is founded on the basic concept of achieving the desideratum of retaining the slug or coupon in the tool so that it is withdrawn from the main as the tool is retracted.

The penetrating action of the tool is a direct function of the rotary motion that is imparted thereto in carrying out the screwing operation. It is also extremely desirable that this operation be carried out under a minimum torque condition.

With the foregoing factors in mind, the present invention has in view as an important objective, the provision of a penetrating tool of the character indicated having a reduced, hollow penetrating end of non-circular shape and which is made of a material having the property of yieldability whereby the non-circular end portion is susceptible of deformation during the cutting operation after which it acquires a set to cause it to retain the slug. This non-circular formation may be an ovate shape which is of course, determined by major and minor axes.

Still another objective of the invention is to provide a tool of the character indicated having a penetrating end portion that is tapered externally towards the cutting edge. This taper cooperates with the ovate shape in achieving the desired cutting action and attendant retention of the slug.

Still another highly important objective of the invention is to provide a penetrating tool of the character indicated which has a new and improved cutting edge and which cutting edge is adapted for use with the ovate tapered end portion. In accordance with this invention, the end of the tool is formed with four cutting edges that are angularly spaced apart 90°. These cutting edges are preferably related with respect to the major and minor axis and are angularly spaced 45° therefrom. The cutting edges are defined by outer ground surfaces at an appropriate angle with respect to the axis of the tool. Moreover, each cutting edge is disposed at an angel with respect to a line that is comparable to a radius. The angle is directed so that the edge forces the material of the main that is to be removed inwardly rather than outwardly.

Yet another important objective of the invention is to provide a penetrating tool of the character foresaid which includes a lubricating system. This system comprises the socket which defines the hollow end and a radial passage located at the closed end of the socket and on the minor axis of the ovate shape. This passage communicates between the socket and the exterior of the penetrating end portion. The socket is packed with a lubricant having a required viscosity for retaining it in position and during the inital stages of the cuttng operation some of the lubricant will be extruded through the notches defining the cutting edges. At the same time, some of the lubricant may be extruded through the passage. During the later stages of the operation, the notches will be closed and the lubricant will be extruded through the passage alone. Due to the fact that the passage is located on the minor axis, there will always be space on the outside to receive the extruded lubricant. This extrusion of the lubricant is caused by the cut slug which functions as a piston. Were it not for the passage, it would be literally impossible for the slug to enter the bore of the tool.

A penetrating tool made in accordance with the above noted objectives may be operated at extremely low torque to cut the slug in the main and this slug will have a lip that is no greater in diameter than the hole that is formed in the main. Thus with the slug retained in the tool, it may be withdrawn from the formed hole. Moreover, due to the ovate shape, the yielding property from which the material is made, and the nature of the cutting edges, the tool will set about the slug as it is formed and positively hold the slug in position within the hollow end. The slug is so formed that there is a positive mechanical interlock between the cutting edges and the slug.

Another important advantage which attaches to a tool made in accordance with the above objectives is that, as the main is penetrated a thin lip or membrane in the shape of a truncated, conic section is formed on the outside diameter of the pipe. This membrane cooperates with a conical shoulder on the tool in functioning as a valve seat when the tool is left in position closing the formed hole in the main.

Various other, more detailed objectives and advances of the invention such as arise in connection with carrying out the above noted ideas in practical embodiment will in part become apparent and in part be hereinafter stated as the description of the invention proceeds.

The invention therefore comprises a T including a penetrating tool having a threaded main body and a reduced tapered penetrating end portion of non-circular shape made of a yieldable material and having four cutting edges and including a lubricating system.

For a full and more complete understanding of the invention reference may be had to the following description and accompanying drawings wherein.

Figure 1:
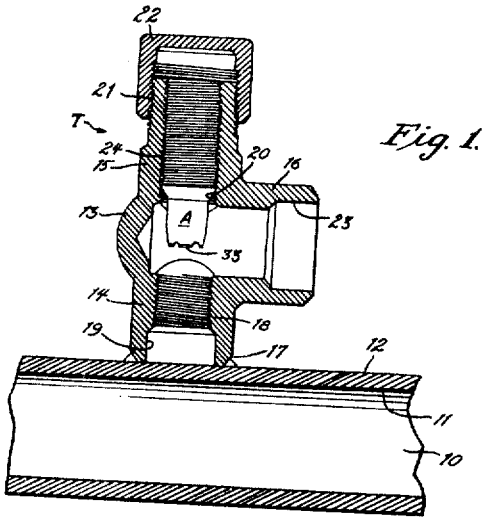
FIGURE 1 is a sectional view through a penetrating T that is made in accordance with the precepts of this invention.

Referring now to the drawings wherein like reference characters denote corresponding parts and first more particularly, FIGURE 1, a gas main is therein illustrated and represented by the reference character 10. The main 10 has a bore 11 and an outer surface 12. A tapping T is referred to in its entirety by the reference character T and is shown as mounted on the outer surface 12 of the main 10.

The tapping T includes a main body portion 13 from which extends a lower extension 14 and an upper extension 15. Extending outwardly at one side from the main body portion 13 is a lateral extension 16 that is commonly known as the house outlet.

The T may be mounted on the main 10 in any appropriate manner. Present day practice indicates that welding is the more desirable method. Thus, the lower extension 14 has a bevelled edge at 17 which facilitates establishing the welded joint.

The lower extension 14 is formed with a threaded bore at 18 and this bore is enlarged at 19 at the lower main engaging end. The upper portion 15 is also formed with a threaded bore 20 which is in alignment with the threaded bore 18 and of the same diameter. A penetrating tool which is referred to in its entirety by the reference character A is normally threadedly mounted in the bore 20 in the manner depicted in FIGURE 1. However, the threads of the tool A are adapted for cooperation with the threaded bore 18 as the tool is moved downwardly in a main penetrating operation.

The upper extension 15 is exteriorly threaded at 21 and a cap 22 is screwed thereonto after the main has been tapped and the tool A retracted into the position of FIGURE 1.

The lateral extension 16 includes a socket at 23 for receiving a house connection in a well known manner.

Referring now more particularly, to FIGURES 2–7, inclusive, the tool A is shown as comprising a main body portion 24. This main body portion 24 is exteriorly threaded as indicated at 25 and these threads at 25 cooperate with the bores 18 and 20 of the T body. At what might be called the upper end of the body 24, the latter is formed with a hexagonal socket 26 which is provided for wrench engaging purposes. Thus, with the cap 22 removed, a wrench may be applied to the socket 26 and due to the threaded action cause the tool to move downwardly into main engaging and penetrating position.

Figure 5:
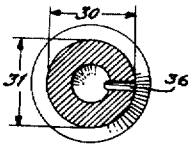
FIGURE 5 is a detailed section through the tool at the lubricating passage being taken on the plane represented by the line 5—5 of FIGURE 2.
Figure 6:
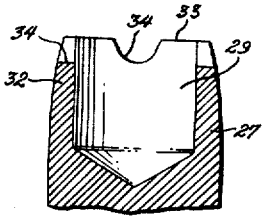
FIGURE 6 is a detailed longitudinal section through the pentrating end portion illustrating one of the notches which form the cutting edges.
Figure 7:
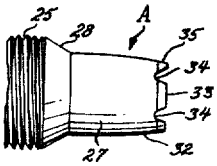
FIGURE 7 is a detailed elevation of the penetrating end depicting in particular, the formation of the cutting edges.

At the end of the tool remote from the socket 26, there is an end portion 27 of reduced diameter with a conical shoulder 28 between this end portion 27 and the main body portion 24. The end portion 27 is formed with a socket 29 which in effect provides a tubular construction. However, the tube is not cylindrical but rather is of a noncircular shape such as being ovate with the shape being defined by a minor axis as indicated at 30 and a major axis at 31 as depicted in FIGURE 5.

*Opposite portions bisected by the major axis 31 constitute spaced lobes which are symmetrically arranged and of equal radius measured from the axis of rotation of the tool, while intervening portions bisected by the minor axis 30 are of slightly lesser radius.*

Figure 9:
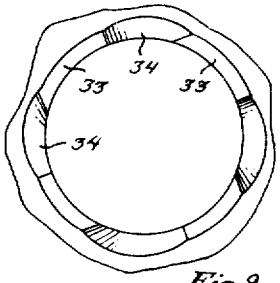
FIGURE 9 is a view in end elevation taken on an enlarged scale, depicting the bevelled nature of the cutting edges.

The tubular end portion 29 has an outer tapered wall 32 that terminates at the free end in cutting edges 33. There are four of these cutting edges 33 which are defined by notches 34 with a cutting edge 33 at each side of a notch 34. Upon referring to FIGURE 9 it will be seen that each edge 33 is bevelled or biased inwardly, that is with the edge proper on the bore side of the wall. There are of course, four notches 34 and these notches are preferably located on the axis of the ellipse defining the ovate shape. At the closed end of the socket 29, there is a radial passage 36 which establishes communication between the socket and the exterior of the end portion 27. This passage 36 is located on the minor axis 30 of the ellipse.

Figure 8:
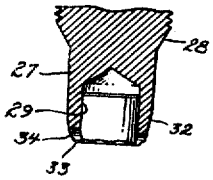
FIGURE 8 is a section through the penetrating end portion after the main has been penetrated and depicts how the slug is retained in the tool.
Figure 2:
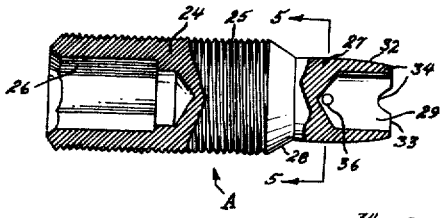
FIGURE 2 is a view taken on an enlarged scale partly in section and partly in elevation of the pool per se.
Figure 3:
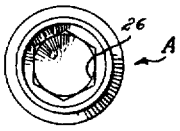
FIGURE 3 is a view taken in end elevation of the wrench engaging end of the tool.
Figure 4:
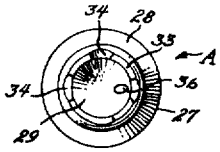
FIGURE 4 is a view in end elevation of the penetrating end of the tool.

The tool A is made from an appropriate tool steel having required properties of yieldability whereby the tubular end portion at 27 is rendered yieldable so that it will deform during the cutting operation and acquire a set about the slug which is cut from the main 10 as shown in FIGURE 8.

It is also notable that the socket 29 is packed with an appropriate lubricant having a viscosity which causes it to remain in position in the socket. While this lubricant may be applied to the socket at any time it will be preferably be done at the site of manufacture.

*Operation*

While the manner of using and mode of operation of the tapping T are believed to be obvious from the illustration of the drawings and description of parts given, they are briefly outlined as follows:

The T is mounted on the main 10 by a welded joint at 17 and the cap 22 removed. A wrench is now applied to the socket 26 and the tool A is rotated in a proper direction to advance it towards the main 10. As the tool A moves downwardly, the threads 25 engage with the threaded bore 18. As this advancing motion is continued, the cutting edges 33 engage the main 10 and cut thereinto. As this action takes place, the metal of the main is caused to flow and move laterally in contrast to an inward radial displacement. Moreover, as the cutting action is continued, the tapered wall of the tubular end portion 27 deforms and acquires a shape more closely approaching the circular.

During the initial stages of the cutting operation, lubricant will be extruded through the notches 34 and this lubricant reduces the friction of the cutting operation.

As the penetrating action continues, the notches 34 become closed. With the slug that is cut from the pipe being forced into the socket 29, lubricant therein is entrapped and creates a back pressure that resists the entry of the slug which is a piston-like action. However, this back pressure is relieved by the passage 36 through which the lubricant is extruded.

Due to the outer tapered surface at 32 and the yieldable property of the tool material, the cutting edges 33 are contracted particularly in the areas of the major axis with the ultimate result that these cutting edges are interlocked with the slug during the final stage of the cutting operation. Moreover, due to the fact that but little of the metal of the main has been forced inwardly but rather is swaged laterally, the overhanging lip which is inevitably formed on the slug is held to an absolute minimum and as a matter of fact is no greater diameter than is the hole which is formed in the main. Thus, with the slug retained in the socket 29, the tool A may be retracted by rotating it in a reverse direction and the slug will be withdrawn through the formed aperture in the main.

The retraction of the tool is continued until is assumes the position of FIGURE 1 within the bore 20 leaving the house outlet open. In this position, the tool A functions as a valve or closure for the bore 20. The cap 22 is then restored to the position of FIGURE 1.

*tinued screwing of said tool inwardly, to permit subsehole is enlarged to a size larger than said slug by con-*

Figure 10:
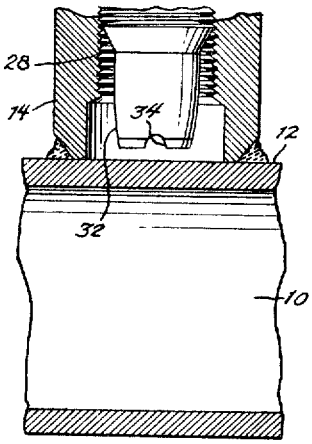
FIGURE 10 is a sectional view illustrating the lower end of the tool as it is about to engage the main.
Figure 11:
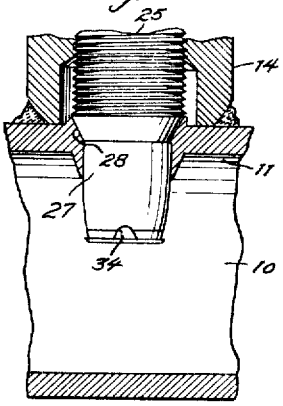
FIGURE 11 is a sectional view similar to FIGURE 10 showing the relation of the tool to the main after completion of the penetrating operation.
Figure 12:
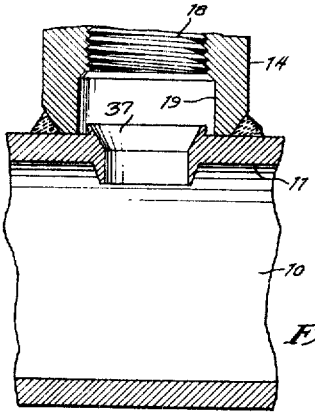
FIGURE 12 is a sectional view of the main after removal of the tool.

Upon referring to FIGURES 10, 11, and 12, it will be noted that a thin lip or membrane 37 is formed on the outside diameter of the main 10. This membrane 37 takes the shape of a truncated conic section. It is peculiarly adapted to cooperate with the conical shoulder 28 on the tool A in functioning as a valve seat. It is to be remembered that the end portion of the tool is often left in the formed hole for protected periods and a good seal against the escape of gas is of prime importance.

With the membrane 37 present, only low torque in the tool is required to achieve a good seal.

While a preferred specification embodiment of the invention is hereinbefore set forth, it is to be clearly understood that the invention is not to be limited to the exact construction, materials and design illustrated and described because various modifications of these details may be provided in putting the invention into practice within the purview of the appended claims.

What is claimed is:

[1. In a tapping T, a tool comprising a threaded main body portion defining an axis of rotation and having wrench engaging means on one end and a penetrating end portion of reduced diameter at the other end, said penetrating end portion being tapered, tubular and of a non-circular shape on the exterior of a cross section normal to said axis.]

2. In a tapping T, a tool having a cylindrical threaded main body portion defining an axis of rotation, wrench engaging means at one end and a penetrating end portion of reduced diameter at the other end, said penetrating end portion being tapered, tubular, of a non-circular shape on the exterior of a cross section normal to the said axis and of a metal that is permanently deformed by the conditions of work to which it is subjected.

3. In a tapping T, a tool comprising a threaded main body portion defining an axis of rotation and having wrench engaging means on one end and a penetrating end portion of reduced diameter at the other end, said penetrating end portion being tapered, tubular and of a non-circular shape on the exterior of a cross section normal to said axis, said tubular penetrating end portion providing a socket having a free end edge, lubricant in said socket, and a passage spaced from said end edge establishing communication between said socket and the exterior of said end portion.

*4. A tapping T comprising a hollow body portion adapted to be secured to a pipe to be tapped and having a threaded bore directed toward the pipe, and a penetrating tool received in said body and having an externally threaded portion screwed into said threaded bore, wrench engaging means at the outer end of said tool for rotation of the tool and a pipe-penetrating portion of reduced diameter at the inner end of said tool and terminating in a cutting edge portion, said tool being rotatable in said body portion to screw said tool inwardly toward a pipe to which said body portion is secured and thereby cut a slug from the wall of said pipe to form a hole therein, the pipe-penetrating end portion of said tool being tubular with a cylindrical bore to receive said slug and being externally tapered outwardly from said cutting edge portion to a diameter larger than said slug, said tapered end portion having an ovate external cross sectional shape normal to the axis of rotation of said tool, whereby said*

*quent withdrawal of said slug through said enlarged hole, said cutting edge portion being permanently deformable by penetration of said pipe wall to interlock with and retain said slug, whereby upon subsequent rotation of said tool in the opposite direction to retract said tool, said slug is retained in said tubular end portion of the tool and is thereby withdrawn from said hole.*

*5. A tapping T comprising a hollow body portion adapted to be secured to a pipe to be tapped and having a threaded bore directed toward the pipe, and a penetrating tool received in said body and having an externally threaded portion screwed into said threaded bore, wrench engaging means at the outer end of said tool for rotation of the tool and a pipe-penetrating tool portion of reduced diameter at the inner end of said tool and terminating in a cutting edge portion, said tool being rotatable in said body portion to screw said tool inwardly toward a pipe to which said body portion is secured and thereby cut a slug from the wall of said pipe to form a hole therein, the pipe-penetrating end portion of said tool being tubular with a cylindrical bore to receive said slug and being externally tapered outwardly from said cutting edge portion to a diameter larger than said slug, said tapered end portion having an external cross sectional shape normal to the axis of rotation of said tool comprising a plurality spaced, symmetrically arranged smooth lobes of equal radius and intervening portions of slightly lesser radius measured from said axis of rotation, whereby said hole is enlarged to a size larger than said slug by continued screwing of said tool inwardly, to permit subsequent withdrawal of said slug through said enlarged hole, said cutting edge portion being permanently deformable by penetration of said pipe wall to interlock with and retain said slug, whereby upon subsequent rotation of said tool in the opposite direction to retract said tool, said slug is retained in said tubular end portion of the tool and is thereby withdrawn from said hole.*

*6. A tapping T according to claim 5, in which said cutting edge portion is formed with notches dividing said cutting edge portion into a plurality of cutting edges.*

*7. A tapping T according to claim 5, further comprising means for lubricating the external surface of said tapered end portion of said tool during penetration of said pipe.*

References Cited

The following references, cited by the Examiner, are of record in the patented file of this patent or the original patent.

UNITED STATES PATENTS

| | | |
|---|---|---|
| 175,812 | 4/1876 | Young et al. |
| 464,252 | 1/1891 | Knoepfel et al. |
| 1,020,302 | 3/1912 | Metz. |
| 1,664,796 | 4/1928 | Spangle. |
| 2,083,476 | 6/1937 | Rossin. |
| 2,947,206 | 8/1960 | Flanagan. |
| 2,990,731 | 4/1961 | Merrill et al. |

FOREIGN PATENTS

| | | |
|---|---|---|
| 77,049 | 7/1919 | Austria. |
| 837,399 | 6/1960 | Great Britain. |

WILLIAM W. DYER, JR., *Primary Examiner.*

G. A. DOST, *Assistant Examiner.*